(12) United States Patent
Stiller et al.

(10) Patent No.: US 6,729,363 B2
(45) Date of Patent: May 4, 2004

(54) MOTOR VEHICLE AIR SPRING SYSTEM HAVING A TIRE-FILL CONNECTION

(75) Inventors: Alexander Stiller, Garbsen (DE); Marc Nettelmann, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/365,396

(22) Filed: Feb. 13, 2003

(65) Prior Publication Data

US 2003/0150509 A1 Aug. 14, 2003

(30) Foreign Application Priority Data

Feb. 13, 2002 (DE) .......................... 102 05 841

(51) Int. Cl.$^7$ .............................................. B65B 31/00
(52) U.S. Cl. ................... 141/38; 141/5; 141/9; 141/67; 141/100; 267/64.28
(58) Field of Search .................... 141/38, 5, 9, 67, 141/100, 1, 4, 102, 105; 267/64.28, 64.19; 340/442, 443; 152/416, 415, 417; 137/224

(56) References Cited

U.S. PATENT DOCUMENTS

| | | | | |
|---|---|---|---|---|
| 5,553,647 A | * | 9/1996 | Jaksic | 152/415 |
| 6,034,597 A | * | 3/2000 | Normann et al. | 340/442 |
| 6,144,295 A | * | 11/2000 | Adams et al. | 141/38 |
| 6,336,481 B1 | * | 1/2002 | Tigges | 141/38 |
| 6,561,017 B1 | * | 5/2003 | Claussen et al. | 73/146 |

FOREIGN PATENT DOCUMENTS

| | | | | |
|---|---|---|---|---|
| DE | 3247371 A1 | * | 6/1984 | B60C/23/00 |
| DE | 4217650 C1 | * | 7/1993 | B60G/17/01 |

OTHER PUBLICATIONS

US 2003/0098787 A1; May 29, 2003; Lin.*
US 2002/0079626 A1; Jun. 27, 2002; Grotendorst et al.*
U.S. patent application Ser. No. 10/240,823, Behmenburg, filed Oct. 7, 2002.

* cited by examiner

Primary Examiner—Gregory L. Huson
Assistant Examiner—Khoa D. Huynh
(74) Attorney, Agent, or Firm—Walter Ottesen

(57) ABSTRACT

An air spring arrangement of the motor vehicle is equipped with a tire-fill device which includes the fill unit (20) and a tire-fill connection unit (4). A filling of a reserve tire is ensured even when there is an electric fault in the level control system. The tire-fill connection unit (4) includes an air supply connection (6), a proximity switch (8), an electric sensor connection (10) and a pneumatic connection (12) for rapid coupling and valve connection. The proximity switch (8) includes a reed contact (28) which includes three terminals (32a, 32b, 32c) which are connected to a control apparatus (34). A component (14) has a pneumatic valve connection (16) and a permanent magnet (18) and is connected to the pneumatic connection (12). The permanent magnet (18) excites the reed contact (28) to switch when the component (14) is connected to the tire-fill connection unit (4).

9 Claims, 3 Drawing Sheets

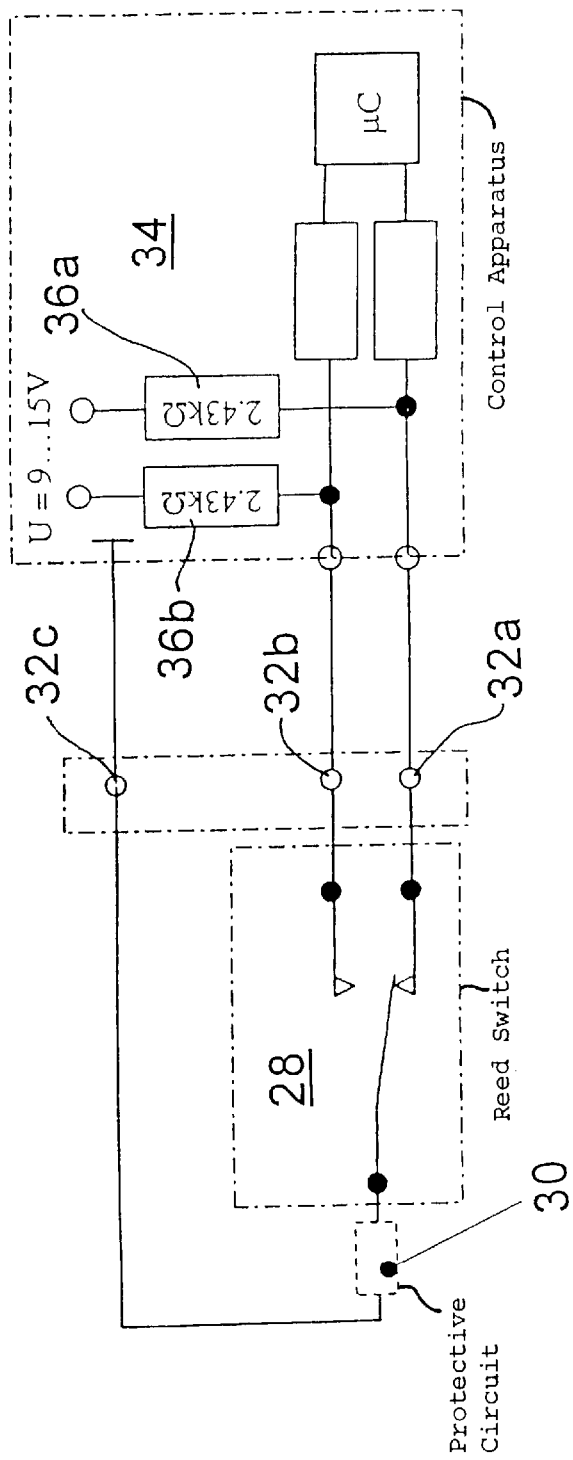
Fig. 2
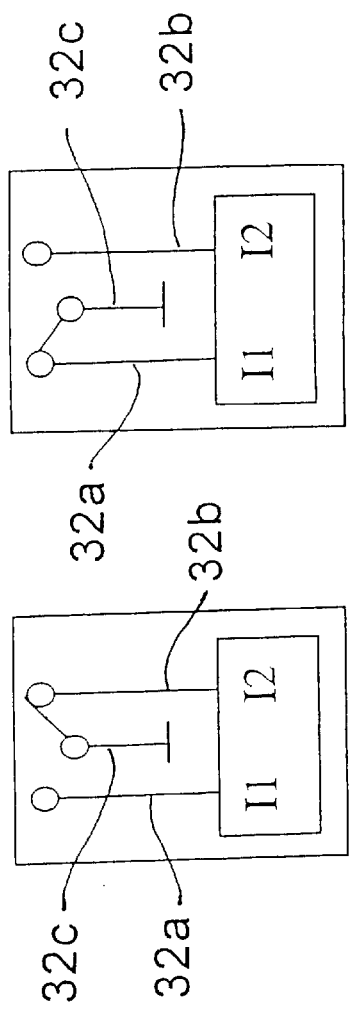
Fig. 3b
Fig. 3a

MOTOR VEHICLE AIR SPRING SYSTEM HAVING A TIRE-FILL CONNECTION

FIELD OF THE INVENTION

The invention relates to an air spring system of a motor vehicle with the system having a tire-fill connection for filling the tire of a spare wheel.

BACKGROUND OF THE INVENTION

U.S. patent application Ser. No. 10/240,823, filed Oct. 7, 2002, discloses configuring the spare wheel of a motor vehicle as a folding wheel which is filled only when needed.

The compressor of the level control system can be used for pumping up the folding wheel in a vehicle equipped with air springs. For this purpose, the motor vehicle air spring system is equipped with tire-fill components.

The structure of the self-diagnosis in conventional level control systems having a tire-fill connection provides that, as a direct reaction to a detected fault, all system components which are directly affected by this fault transfer into a safe state. For example, for an electrical fault at the compressor relay, the compressor is transferred into the reliable state "off".

For the tire-fill connection, this means that a tire filling is no longer permissible when there is an electrical fault at the contacts, that is, the tire-fill connection can no longer be used.

The above means that, when the diagnosis "tire-fill connection fault" is made, a tire filling was not permitted up to now for such air spring systems which are supplemented to include tire-fill components. Accordingly, it can happen for an electrical fault (for example, because of a short circuit or a line interruption), that neither a refilling takes place nor is a warning outputted to the driver. The present invention overcomes this unwanted situation.

SUMMARY OF THE INVENTION

The method for filling a spare wheel according to the invention is primarily applicable in vehicle systems having an air spring level control system and tire-fill hardware.

The method of the invention is for filling a tire of a spare wheel utilizing an air supply unit of an air spring system of a motor vehicle equipped with a tire filling system including a tire-fill connection unit and a fill unit. The arrangement includes: in a fault-free condition, changing the logic states of the inputs (32a, 32b) of a reed switch connected to a control apparatus from low/high to high/low when the tire-fill connection unit is attached; in a fault-free condition, changing the logic states of the inputs (32a, 32b) from high/low to low/high when disconnecting the tire-fill connection unit; the control apparatus functioning to detect high/high and, when the high/high is detected, then concluding either the third input (32c) has undergone a short circuit to positive or the second input (32b) has undergone a line interruption (or short circuit to positive) which cannot be diagnosed when the tire-fill connection unit is not attached; and, the control apparatus functioning to detect low/low that, when the low/low is detected, then concluding that either the second input (32b) or the third input (32c) has a short circuit to ground which can be diagnosed when said tire-fill connecting unit is not mechanically attached and the fill operation can be started when only one of the first and second inputs (32a, 32b) changes its logic state.

The method of the invention permits filling a spare wheel of a motor vehicle even when there is an electrical fault in the level control system of the air spring system.

With the method and arrangement of the invention, a significantly higher availability of the special function "reserve wheel filling" is provided. This is explained with the aid of two examples below.

EXAMPLE 1

A vehicle travels off road and the driver selects the largest possible ground clearance via the level operator-controlled component. An electrical fault is diagnosed (for example, a short circuit to the positive terminal) without the driver having connected the tire-fill connection. The consequence here is that the control level system operates in a special emergency condition designed for this situation, that is, manual control operations are no longer permitted in order to avoid travel-dynamic critical situations. Only speed control takes place. The tire-fill function now operates pressure orientated, that is, a pressure of 4.5 bar is built up up to the outlet valve. If now the tire-fill connection unit is connected, the tire is filled. If the driver actuates the operator-manipulated component, then the reserve wheel is filled.

EXAMPLE 2

The same start conditions are present as in Example 1. Here, the driver wants to eliminate a flat tire. In this instance, when the driver attaches the tire-fill tube, a sleeping fault is detected (for example, a short circuit to ground is first detected because, with the attachment, only the closing contact changes its state). The consequence here is that the level control system operates in a special emergency mode for this situation, that is, all manual control operations are no longer permitted in order to prevent travel-dynamic critical situations. Only speed conditioned controls take place. The tire-fill function operates pressure orientated, that is, a pressure of 4.5 bar is built up up to the outlet valve. If the tire-fill tube is now attached, then this too will be filled. If the driver actuates the manual operator-controlled unit, then the spare wheel is filled.

BRIEF DESCRIPTION OF THE DRAWINGS

The invention will now be described with reference to the drawings wherein:

FIG. 2 is an electric schematic of a portion of the proximity switch of the tire-fill connection unit and the control apparatus;

FIGS. 3a and 3b show respective switch positions of the change-over switch (reed contact); and, FIG. 4 is a schematic showing the concept of the invention in the context of an electrical fault at the change-over switch of the tire-fill connection unit.

DESCRIPTION OF THE PREFERRED EMBODIMENTS OF THE INVENTION

Figure 1:
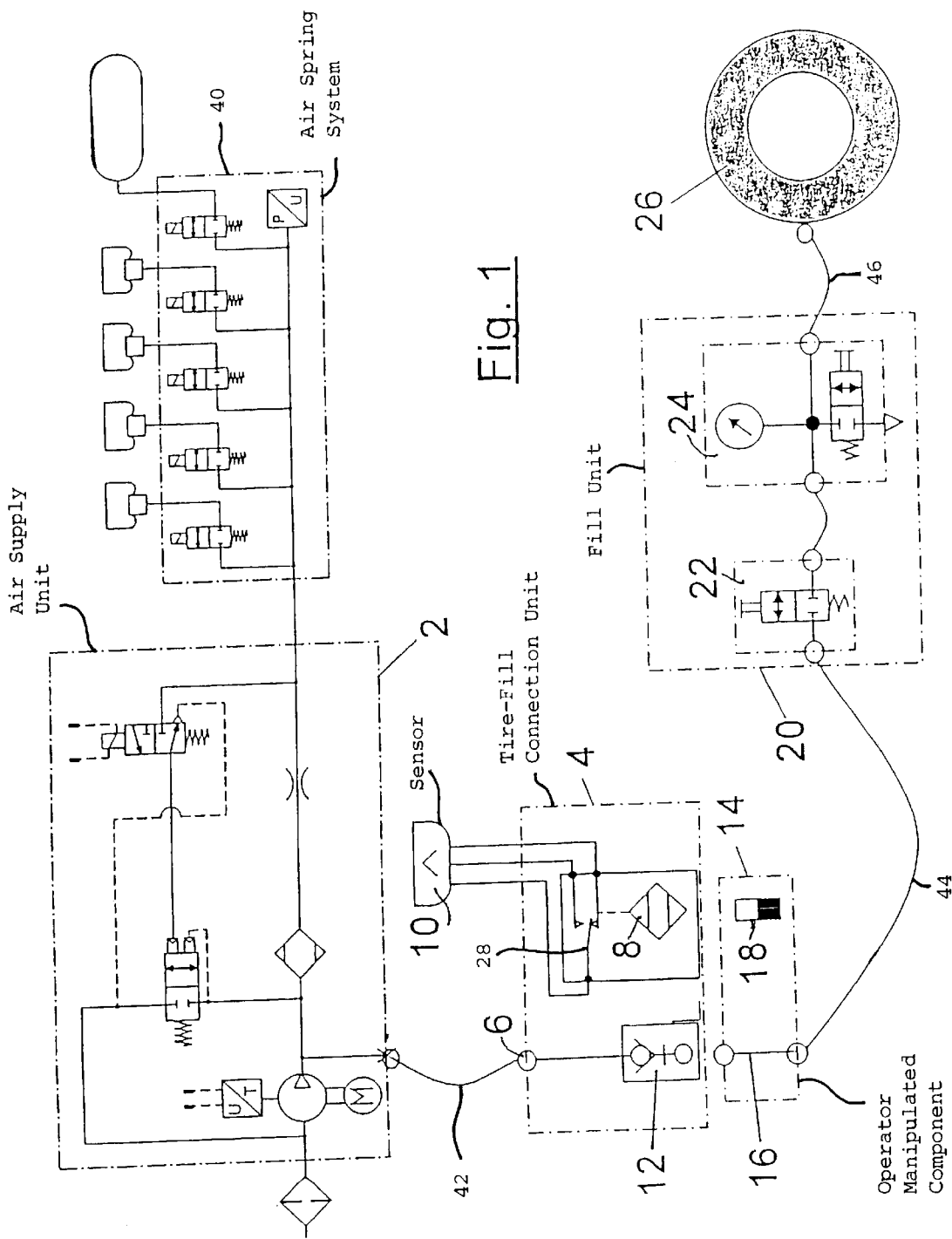
FIG. 1 is an electric-pneumatic schematic of an air spring system provided with tire-fill connection components.

FIG. 1 is an electric-pneumatic block circuit diagram of an air spring system 40 which includes a tire-fill connection unit 4. Reference numeral 2 identifies the air supply unit of the motor vehicle air spring system. The air supply unit 2 includes a compressor. An air spring system is shown, for example, in U.S. patent application Ser. No. 10/240,823, filed Oct. 7, 2002, and incorporated herein by reference.

The tire-fill connection unit 4 is connected to the air supply unit 2 via hose 42. This tire-fill connection unit 4 includes an air supply connection 6, a proximity switch 8, an electric sensor 10 for sensing air pressure connected at terminals (32a, 32b, 32c) and a pneumatic connection 12 for rapid coupling and to establish a valve connection. An operator-manipulated component 14 includes a pneumatic connector 16 for threadably engaging a connector of hose 44. The pneumatic connector 16 also connects with pneumatic connection 12.

The operator-manipulated component 14 is connected to the pneumatic connection 12 for rapid coupling and also includes a permanent magnet 18. A fill unit 20 having a fill valve 22 and a manometer 24 is connected to the operator-manipulated component 14. Reference numeral 26 identifies a spare wheel having a tire to be inflated. The tire-fill connection unit 4 includes a three-line connection. Hose 46 connects the tire of the spare wheel to the fill unit 20.

FIG. 2 shows details of the proximity switch 8 of the tire-fill connection unit 4. This proximity switch 8 comprises a change-over switch (reed contact) 28 and a protective circuit 30 mounted ahead of the change-over switch to counter short circuits. The reed contact 28 has three terminals (32a, 32b, 32c) which are also connected to a control apparatus 34. The reed contact or change-over switch 28 is positioned in the tire-fill connection unit 4. The magnet 18 of the operator-manipulated component 14 excites the change-over switch 28 via proximity switch 8 for switching when there is an attachment of the component 14 to unit 4. The reed contact 28 is configured as a change-over switch and is read in via two input pins (32a, 32b) of the control apparatus and is diagnosed. Depending upon the contact position, the ground potential 32c is switched to one of the two input pins (32a, 32b). On the printed circuit board of the control apparatus 34, the input pins (32a, 32b) are held to a high level via two pull-up resistors (36a, 36b).

Input 32c is "active high" for an attached operator-manipulated element and input 32b is at active low when there is an attached operator-manipulated element 14.

Figure 4:
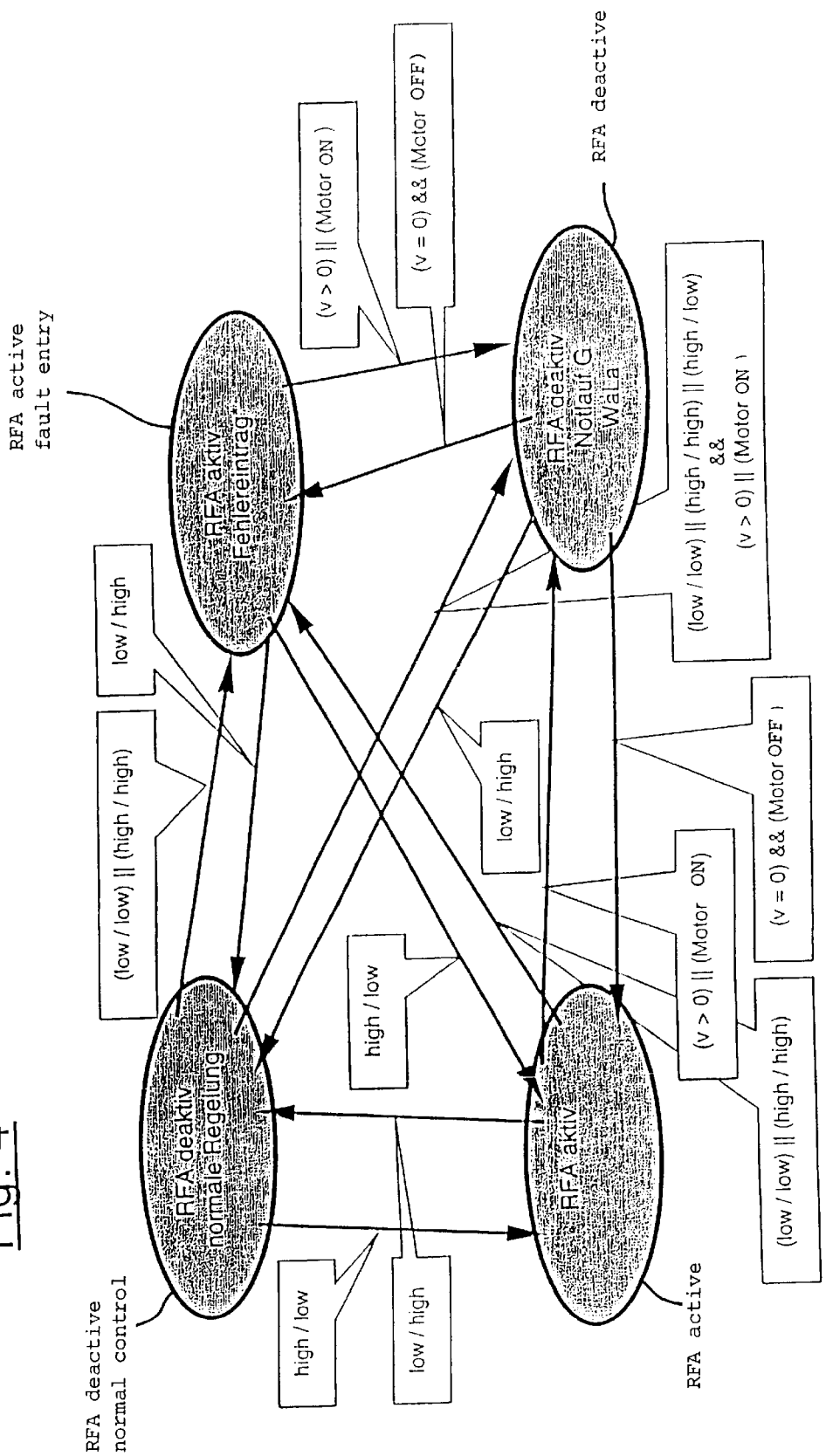

According to the invention, the following diagnoses are made when there are electrical faults at the change-over switch 28 of the tire-fill connection unit 4 or RFA (FIG. 4).

Status Table of the Change-Over Switch (see FIG. 4):

| Input 32c | Input 32b | Status |
|---|---|---|
| low | low | low/low: malfunction ⇒ electrical fault: short circuit to ground |
| low | high | low/high: OK ⇒ no operator-controlled element attached Tire-fill connection off |
| high | low | high/low: OK ⇒ Operator-controlled element attached Filling of tire, Tire-fill connection on |
| high | high | high/high: not OK ⇒ electric fault short circuit to positive or line interruption, that is, implausible |

The tire-filling connection unit 4 according to the invention functions as delineated below.

In the fault-free state, the inputs (32a, 32b) change their logic states from low/high to high/low when the tire-fill connection unit 4 is attached.

In the fault-free state, the inputs (32a, 32b) change their logic states from high/low to low/high when the tire-fill connection unit 4 is removed.

If the control apparatus 34 detects high/high, then either the input 32c is subjected to a short circuit toward plus or the input 32b has a line interruption (or short circuit to plus) which cannot be diagnosed when the tire-fill connection unit 4 is not attached.

If the control apparatus 34 detects low/low, then either the input 32b is subjected to a short circuit to ground or the input 32c has a short circuit to ground which can be diagnosed with a mechanically non-attached tire-fill connection unit 4.

In both fault cases, it cannot be clearly distinguished whether the fault occurred for a non-attached tire-fill connection unit 4 or whether the fault only occurred with the attachment of the mechanical connection 16.

In order to nonetheless ensure a filling of the reserve tire, a fill operation already begins when only one input changes its logic state (and therefore both inputs have the same states). The corresponding fault is then diagnosed and stored and a warning is outputted to the driver (yellow warning lamp) and, in the case that the conditions for a tire filling are no longer present, then a corresponding emergency operation is set for the level control.

This procedure makes it possible for the driver to obtain a diagnosis with a tire filling when connecting the reed contact 28. The faults diagnosed include so-called sleeper faults (short circuit to ground at input 32c, short circuit to positive at input 32b, line interruption at line 32b). The filling of the tire is not interrupted. An availability of the tire-fill connection unit 4 is thereby significantly increased.

The above operates disadvantageously on the level control because if a fault at the tire-fill connection unit 4 is statically diagnosed, then it cannot be clearly detected any longer whether the tire-fill connection unit 4 was clamped on or not. In this case, the level control dwells in a safe system state wherein only manual and automatic control operations are permitted, that is, the so-called emergency phase.

A higher availability of the tire-fill connection unit 4 is viewed by customers as having a higher priority than a completely functioning level controller which permits no filling of a reserve tire in the case of a tire-fill connection unit fault.

It is understood that the foregoing description is that of the preferred embodiments of the invention and that various changes and modifications may be made thereto without departing from the spirit and scope of the invention as defined in the appended claims.

What is claimed is:

1. A method for filling a tire of a spare wheel utilizing an air supply unit of an air spring system of a motor vehicle equipped with a tire filling system including a tire-fill connection unit and a fill unit, said method comprising the steps of:

in a fault-free condition, changing the logic states of the inputs (32a, 32b) of a reed switch connected to a control apparatus from low/high to high/low when said tire-fill connection unit is attached;

in a fault-free condition, changing the logic states of the inputs (32a, 32b) from high/low to low/high when disconnecting said tire-fill connection unit;

said control apparatus functioning to detect high/high and, when said high/high is detected, then concluding either the third input (32c) has undergone a short circuit to positive or the second input (32b) has undergone a line interruption or short circuit to positive which cannot be diagnosed when said tire-fill connection unit is not attached; and, said control apparatus functioning to detect low/low and, when said low/low is detected, then concluding that either the second input (32b) or the third input (32c) has a short circuit to ground which can be diagnosed when said tire-fill connecting unit is not mechanically attached and the fill operation can be started when only one of said first and second inputs (32*a*, 32*b*) changes its logic state.

2. The method of claim 1, wherein a fault is diagnosed and stored and/or a warning is outputted to the driver.

3. The method of claim 1, wherein an emergency operation of the level control system is initiated in the case wherein conditions for filling the tire are no longer present.

4. An arrangement for filling the tire of a spare wheel in a motor vehicle equipped with an air spring system having an air supply unit, the arrangement comprising:

a tire-fill connection unit having an air supply connection connectable to said air supply unit;

a fill unit having an input connected to said tire-fill connection unit and an output connectable to the tire to be filled;

said tire-fill connection unit including a proximity switch and a reed switch operatively connected to said proximity switch;

a control apparatus;

said reed switch having first, second and third inputs (32*a*, 32*b*, 32*c*) connected to said control apparatus; and, (a) said reed switch functioning in a fault-free condition to change the logic states of the first and second inputs (32*a*, 32*b*) thereof from low/high to high/low when said tire-fill connection unit is attached;

(b) said reed switch functioning in a fault-free condition, to change the logic states of the first and second inputs (32*a*, 32*b*) from high/low to low/high when disconnecting said tire-fill connection unit;

(c) said control apparatus functioning to detect high/high and when said high/high is detected, then either the third input (32*c*) has undergone a short circuit to positive or the second input (32*b*) has undergone a line interruption or short circuit to positive which cannot be diagnosed when said tire-fill connection unit is not attached; and, (d) said control apparatus functioning to detect low/low, then either the second input (32*b*) or the third input (32*c*) has a short circuit to ground which can be diagnosed when said tire-fill connection unit is not mechanically attached and the fill operation can be started when only one of two first and second inputs (32*a*, 32*b*) changes its logic state.

5. The arrangement of claim 4, further comprising a protective circuit connected ahead of said reed switch to protect against a short circuit.

6. The arrangement of claim 4, wherein said tire-fill connection unit includes a pneumatic connection; and, said arrangement further comprises an operator-manipulated component having a valve connection ad a permanent magnet; said operator-manipulated component being connectable between said fill unit and said tire-fill connection unit; and, said permanent magnet being diagnosed so as to excite said reed switch via said proximity switch when said operator-manipulated component is connected to said tire-fill connection unit.

7. The arrangement of claim 6, wherein said fill unit is connectable to said pneumatic connection; and, said fill unit including a fill valve and a manometer which are likewise connected to said pneumatic connection.

8. The arrangement of claim 4, wherein said reed switch is configured as a changer which can be read in and diagnosed via said first and second inputs (32*a*, 32*b*); and, said arrangement further comprising means for switching to ground in dependence upon the contact position on one of said first and second inputs (32*a*, 32*b*).

9. The arrangement of claim 4, aid control apparatus including two pull-up resistors which are held at high level.

* * * * *